Patented Sept. 22, 1942

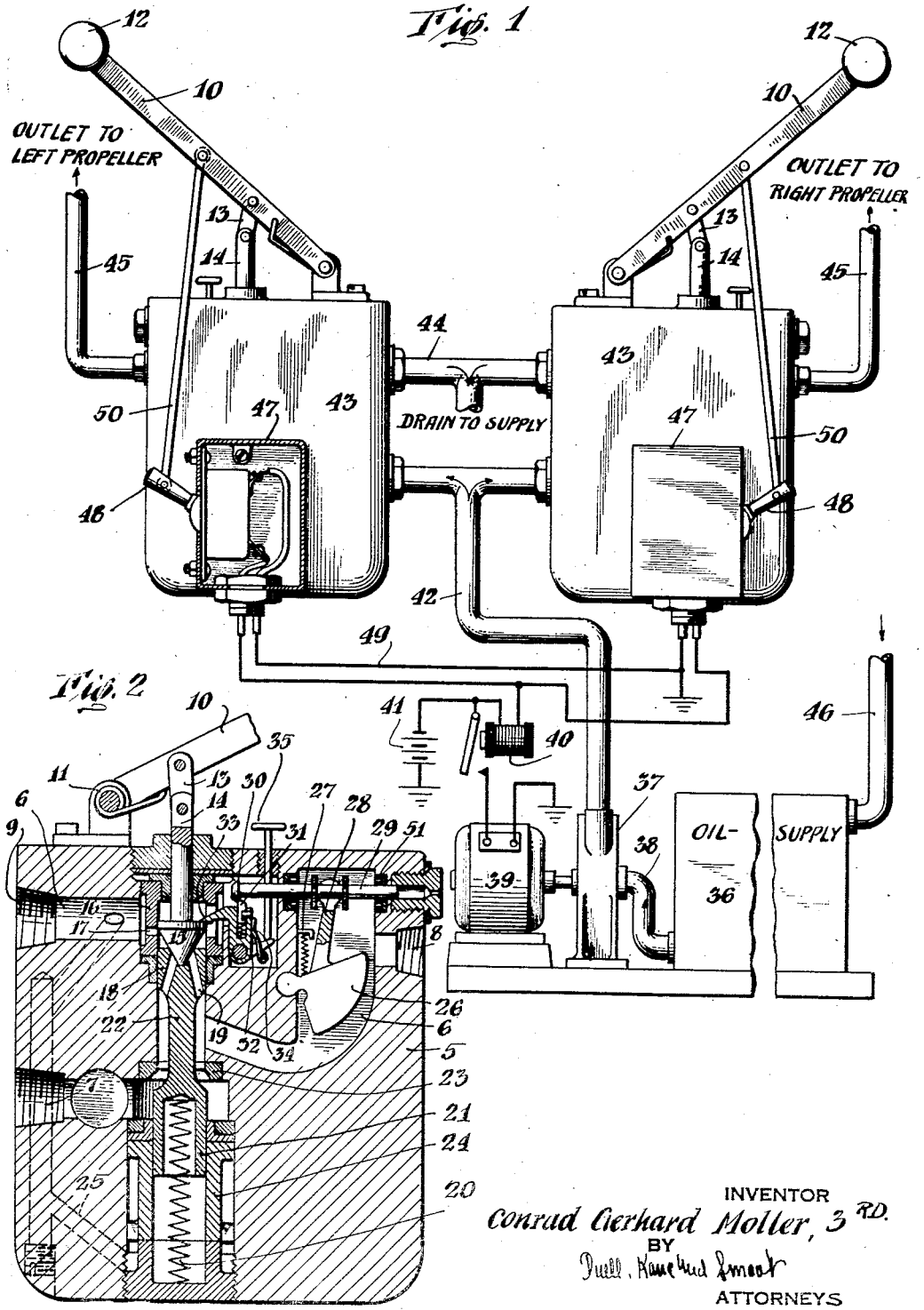

2,296,563

UNITED STATES PATENT OFFICE 2,296,563

CONTROL

Conrad Gerhard Moller, 3rd, New Canaan, Conn., assignor to The Acrotorque Company, Cleveland, Ohio, a corporation of Connecticut Application November 9, 1939, Serial No. 303,598

5 Claims. (Cl. 200—53)

This invention relates to a structurally and functionally improved control and in certain respects presents an improved structure over that disclosed in my prior application for United States Letters Patent on Hydraulic control, filed on August 5, 1939, and identified under Serial Number 288,494, now Patent 2,268,764, January 6, 1942.

It is an object of the invention to furnish a control primarily intended for use in connection with fluid systems and particularly hydraulic systems; such control serving not alone to govern a flow of fluid—in the sense that it acts as a valve—but also serving to control the source of such flow as, for example, a motor driven pump.

As such, while the present invention may be advantageously employed in numerous different associations, it will be particularly valuable when used in conjunction with a hydraulic system having no accumulator tank or similar element. In other words, the single control will serve not alone to establish a potential flow of fluid but will also function to permit such flow through pre-determined channels and until certain conditions have been established. Thereupon, the flow through the channels may be interrupted and the source of such flow may also be rendered inoperative.

A further object of the invention is that of furnishing a control such as afore described and which will—for example—function to interrupt a fluid flow upon a change in the rate of such flow occurring within the system.

An additional object is that of designing a control which will embody relatively few parts, each individually simple and rugged in construction, and operating over long periods of time with freedom from all difficulties.

With these and other objects in mind, reference is had to the attached sheet of drawings illustrating one practical embodiment of the invention and in which:

Fig. 1 is a somewhat diagrammatic view of a system showing controls in association therewith; and Fig. 2 is a sectional view taken through one of the controls.

The present invention is ideally adapted for employment in aircraft and so that the pilot may control the feathering and unfeathering of the propellers. Accordingly, in the following description, and accompanying drawing, the invention has been described and shown in such an association. This however, is to be regarded in an illustrative sense rather than a limiting sense, in that the control may be employed on the aircraft for numerous other purposes and may likewise be utilized in installations not involving aircraft.

Thus, referring primarily to Fig. 2 wherein a valve, such as has been shown in my earlier application, is illustrated, it will be seen that the reference numeral 5 indicates a body formed of metal or other suitable material and which is furnished with bores 6, such that it is provided with an inlet opening 7, a discharge opening 8, and a further discharge opening 9, all of which openings are interconnected.

The body 5 may thus be regarded as a casing and mounted upon the same to have swinging movement, is a handle 10. This handle may normally be urged to a raised position under the influence of a spring 11. The handle is conveniently provided with an actuating knob 12, and is link-connected as at 13, to the stem 14 of a valve 15. This valve lies adjacent the passage which communicates directly with the outlet 9 and preferably moves within a guide or sleeve 16 having openings 17 formed through its walls.

Valve 15 cooperates with a seat portion 18 provided with passages 19, and governs the flow of fluid through the latter. Additionally, it serves to shift the seat portion 18 against the action of a spring 20. This spring has its end thrusting against the base of a bore formed in a valve body 21, which latter may be integral with valve body 18, but in any event is coupled to the same in any convenient manner such as by means of a stem 22.

Valve body 21 lies adjacent the passage directly communicated with inlet opening 7 and cooperates with a seat 23 interposed between such passage and the passages which have direct communication with outlets 8 and 9. To insure a perfect seat, it is preferred that the seat 23 and valve 21 have their meeting surface ground in a manner such that when these parts contact a flow of fluid past the same is precluded. At this time, it will also be noted that the movement of the valve 21 may be guided or confined by a sleeve 24 and this sleeve may be formed with openings communicating with a passage 25, the outer end of which empties into the bore adjacent opening 9.

An arcuate member 26 is pivotally supported within the passage extending in communication with opening 8 and a spring 27 may supplement the action of gravity to insure that member 26 normally presents an obstruction which reduces to a maximum extent, the effective cross-sectional area of the passage within which it is disposed. In this connection, it is to be observed that the radius of the outer edge of member 26 is different from that established by the point of pivotally mounting of such member. Accordingly, the greater the degree of upward movement of the member the less obstructed will be the passage adjacent discharge outlet 8.

Secured to member 26 is an arm 28 coupled to a rod 29. The inner end of this rod carries a bevelled head or detent 30 for cooperation with a spring pressed latch 31, carried by pivotally mounted pawl member 32. The latter has an extension 33 for cooperation with the body of valve 15 and it is normally urged to the position shown by means of a spring 34. Finally, it will be observed that an actuator 35 is cooperable with member 32 in order to release the same from engagement with valve 15.

A unit such as this is disclosed in my afore-identified application, and the operation of the same will be hereinafter more particularly brought out. Any desired number of these units may be associated in a common system or in related systems. Such an association has been illustrated in Fig. 1 wherein—as afore brought out—the invention has been shown as employed in connection with aircraft.

Thus, in this view, the numeral 36 indicates a source of supply for fluid, such as oil, and which is connected to a pump 37 by means of a conduit 38. The pump is driven by an electric motor 39, the operation of which is governed by a relay 40. A source of electrical current supply 41, is provided to complete a functioning of the relay as well as the motor. Extending from the pump is a high-pressure line 42, which as shown may be coupled to a pair of units 43, each having the structure described in connection with Fig. 2. Such coupling is through the openings 7. Openings 9 of these units are coupled to a return line 44. Openings 8 of the units are coupled by lines 45 to, for example, the propeller feathering mechanisms associated with the aircraft. From these mechanisms return lines (not shown) extend towards the reservoir or tank 38, such lines together with the return line 44 being coupled, for example, to line 46.

Associated with each of the units 43 is a switch including a casing 47, from which a handle or actuating element 48, extends. The inner mechanisms of these switches have not been shown. Suffice it to say, that they may embody any suitably heavy-duty construction, and preferably be of the "snap type." Extending from these switches are leads 49 which are coupled to the relay 40, and serve—when the handles 10 are depressed—to close the circuit through such relay. This will occur regardless of whether one, or more of units 43, is actuated, because each of the elements 48 is preferably connected by a link 50, to the handle 10 of the particular unit on which the switch is mounted.

Thus, it is apparent that when the pilot depresses any one of the handles 10, he will in addition to operating the valve mechanism, close one or more of the switches to energize relay 40. Such energization will cause motor 39 to be operated to force fluid under-pressure through line 42, and thence through lines 45. This will continue until handles 10, or their equivalents, again shift upwardly at which time the circuit through the relay will be opened to thus de-energize motor 39, and interrupt further operation of the pump 37.

Now, considering the manner in which the valve mechanism functions, it will be observed that under normal conditions, valve 21 will be in contact with seat 23 to seal opening 7 from opening 8. Also, valve 15 will be out of contact with its seat 18, and the handle 19 will be in its most elevated position as shown in Fig. 1. If, now, this handle is depressed, it will force valve 15 into contact with seat 18 and continued movement will result in a thrust being transmitted through stem 22 to valve 21 to thus unseat the latter. With such movement of the parts, the extension 33 of that element 32 will override valve 15 to maintain the latter in the position which has been established. Fluid will now be free to flow from pump 37 through the unit 43 and out of the passages 45. In such flow, element 26 will be rocked upwardly, the degree of such rocking being dependent upon the volume of flow. This movement will cause rod 29 to be shifted inwardly past pawl 31. Accordingly, the parts will assume the position shown in Fig. 2.

The value of the particular construction embodied in this valve is especially predicated on the fact that without adjustment, the valve will serve to govern and be responsive to flows of radically different ranges. However, it is to be understood that the present invention might be equally well employed in connection with a valve such as is especially shown in Figs. 3 and 4 of the earlier application for United States Letters Patent filed in the name of Elias Orshansky, Jr., and my own name, on August 27, 1938, under Serial Number 227,072, now Patent 2,225,082, December 17, 1940.

In either event, it will be understood that the flow will continue until the apparatus controlled by the flow has substantially completed its actuation so that the rate of flow through lines 45 begins to diminish. Under such circumstances, the parts shift so that member 32, or its equivalent, releases valve 15 and the latter moves upwardly. This movement will be simultaneous with the upward movement of seat 18, and valve 21 until the latter engages its seat 23. Thereafter, valve 15 under the action of spring 11 will move out of contact with its seat 18 so that surplus fluid may drain through opening 9 by flowing through passages 19. Any other surplus fluid will drain through passages 25.

As has been fully disclosed in my prior applications, a pilot or operator may actuate the valve to secure a number of different results. Also, by, for example, actuator 35, the entire operation of the valve may be interrupted. Additionally, it will be understood that suitable packing 51, is disposed at all points where leakage might otherwise occur. Finally, and as afore brought out, the upward movement of the handle will, of course, serve to interrupt the flow of current through leads 49, so that as the valve reaches a closed position, further operation of the pump is interrupted.

Thus, among others, the several objects of the invention, as specifically aforenoted, are achieved. Obviously, numerous changes in construction and rearrangements of the parts might be resorted to without departing from the spirit of the invention as defined by the claims.

I claim:

1. A control including in combination a switch, a body formed with inlet and outlet openings and a discharge opening, a valve interposed between said inlet and outlet openings and cooperable with a seat to prevent a flow of fluid from one opening to the other, a sealing portion coupled to and movable with said valve and formed with an opening through its body, such opening affording communication between said outlet opening and said discharge opening, a further valve body normally spaced from and movable into contact with said sealing portion to seal the opening therethrough, means coupled to said further valve to cause the same to engage said portion, said switch being coupled to said last named means to be closed as said further valve engages said portion, means responsive to a diminishing rate of flow of liquid from said inlet to said outlet opening to permit movement of the valve connected to said portion onto its seat so that fluid flow from said inlet to said outlet opening is interrupted and said switch is simultaneously opened.

2. A control for liquids including in combination a switch, a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve and switch, means connected to said last named means for maintaining said main valve in open position, and means responsive to a change in the rate of flow of the liquid from said inlet to said outlet opening to cause said main valve to close and prevent further flow from said inlet to said outlet opening and to allow said second valve to open, thereby permitting a flow past the same and also to open said switch.

3. A control for liquids including in combination, a switch, a body formed with inlet and outlet openings and also a discharge opening, said body being moreover formed with passages and bores interconnecting said openings, a main valve positioned within said body for controlling the flow of liquid from said inlet to said outlet opening, a second valve for controlling the flow of liquid through said bores and passages and from the outlet opening to said discharge opening, means for opening said main valve and simultaneously closing said second valve and switch, means connected to said last-named means for maintaining said main valve in open position, means responsive to a change in the rate of flow of the liquid from said inlet to said outlet opening to render said valve maintaining means inoperative and to cause said main valve to prevent further flow from said inlet to said outlet opening and to open said switch and said second valve to permit a flow past the latter, said flow responsive means including means disposed in advance of said outlet opening and providing a movable flow-obstructing member, the position of which will be dependent upon the rate of flow through said inlet opening.

4. A control including in combination a switch, a casing formed with inlet, outlet and discharge openings, and passages interconnecting said openings, means for preventing flow of fluid from said discharge opening, means whereby fluid may flow from said inlet to said outlet opening, means responsive to a sufficient diminution in the volume of such flow per unit of time for preventing further fluid flow through said inlet opening to said outlet opening and connecting said outlet opening with said discharge opening and means connecting said switch to said control whereby with fluid flowing from said inlet to said outlet opening, said switch will be closed and with such flow interrupted, said switch will be open.

5. A hydraulic control including in combination, a switch, a body formed with inlet and outlet openings and passages connecting said openings, a valve interposed within said passages, means for urging said valve to closed position whereby, to obstruct the flow of liquid from said inlet to said outlet opening, means whereby said valve may be shifted to opened position, means connecting said switch to said last named means to simultaneously close said switch, means for automatically maintaining said valve in such open position, a member movably mounted by said body and furnishing an orifice through which liquid will flow when said valve is in unseated position, the area of said orifice varying according to the position of said member and substantially in direct proportion to the volume of flow per unit of time from the inlet to the outlet opening, means for connecting said member with said maintaining means to render the latter inoperative upon said member moving in a predetermined direction, said member moving in such direction upon a sufficient diminution in the volume of liquid flow per unit of time occurring from said inlet to said outlet opening, and said switch simultaneously moving to open position.

CONRAD GERHARD MOLLER, 3RD.